(12) United States Patent
Mart

(10) Patent No.: US 10,012,367 B1
(45) Date of Patent: Jul. 3, 2018

(54) FORWARD COMPATIBLE RETROFITTING ROADWAY LIGHT FIXTURES VIA A UNIVERSAL ADJUSTABLE L-BRACKET

(71) Applicant: Gary K. Mart, Coral Springs, FL (US)

(72) Inventor: Gary K. Mart, Coral Springs, FL (US)

( * ) Notice: Subject to any disclaimer, the term of this patent is extended or adjusted under 35 U.S.C. 154(b) by 0 days.

(21) Appl. No.: 15/277,011

(22) Filed: Sep. 27, 2016

(51) Int. Cl.
| | |
|---|---|
| *F21V 19/02* | (2006.01) |
| *F21V 21/14* | (2006.01) |
| *F21S 8/08* | (2006.01) |
| *F21K 9/237* | (2016.01) |
| *F21K 9/235* | (2016.01) |
| *F21V 3/00* | (2015.01) |
| *F21Y 105/10* | (2016.01) |
| *F21Y 115/10* | (2016.01) |

(52) U.S. Cl.
CPC ............. *F21V 21/14* (2013.01); *F21K 9/235* (2016.08); *F21K 9/237* (2016.08); *F21S 8/086* (2013.01); *F21V 3/00* (2013.01); *F21V 19/02* (2013.01); *F21Y 2105/10* (2016.08); *F21Y 2115/10* (2016.08)

(58) Field of Classification Search
USPC ................ 362/418, 427, 429, 430, 432
See application file for complete search history.

(56) References Cited

U.S. PATENT DOCUMENTS

| | | | | |
|---|---|---|---|---|
| 9,605,840 B1* | 3/2017 | Zou | ..................... | F21V 29/673 |
| 2010/0220488 A1* | 9/2010 | Zheng | .................. | F21V 29/677 |
| | | | | 362/373 |
| 2013/0141926 A1* | 6/2013 | McDermott | ......... | B60Q 1/2615 |
| | | | | 362/485 |
| 2017/0120805 A1* | 5/2017 | Marchese | ............ | B60Q 1/2611 |

\* cited by examiner

*Primary Examiner* — Vip Patel
(74) *Attorney, Agent, or Firm* — Patents On Demand; Brian K. Buchheit

(57) ABSTRACT

A female lighting socket connector of a light fixture can be removed to expose electrical leads of the fixture. When an electric light is present within the female light socket, the electric light can be removed prior to removing the female lighting socket. A short end of a universal adjustable L-bracket can be affixed to a structural member of the light fixture. A positionable planar LED array can be attached to a long end of the bracket to place the LED in a forward facing position. The position can permit the light emitted from the LED to illuminate an immediate area. Electrical leads of the LED can be directly connected to the exposed electrical leads of the light fixture. The removal and connecting steps can prevent backwards compatibility. When the LED is connected to the fixture, the bracket and the LED can be substantially within an enclosure and/or a hood.

20 Claims, 4 Drawing Sheets

Embodiment 110

*Front View 111*

*Side View 121*

Embodiment 110

*Front View 111*

*Side View 121*

*Top View 131*

Embodiment 150

*Bottom View 151*

*Side View 161*

Embodiment 310

Embodiment 350

US 10,012,367 B1

FORWARD COMPATIBLE RETROFITTING ROADWAY LIGHT FIXTURES VIA A UNIVERSAL ADJUSTABLE L-BRACKET

BACKGROUND

The present invention relates to the field of and roadway lighting, more particularly, to forward compatible retrofitting roadway light fixtures via a universal adjustable L-bracket.

Roadway lighting such as halogen lamps used for lighting highways, sidewalks and public spaces (e.g., stadiums, parks) are energy intensive devices. In many instances, lighting can be required to be active for twelve or more hours (e.g., dusk to dawn), which can draw a considerable amount of electrical energy over this duration. To combat this energy inefficiency, government programs which provide incentives to cities and towns have been initiated. These programs offer credits and/or reduced rates for purchasing energy efficient components such as Light Emitting Diode arrays to retrofit roadway lighting. Frequently these retrofit projects become stalled due to cost or time restraints, or are never started due to administration changes. For example, since LED arrays are more costly than halogen, LED arrays may be utilized until budget cuts force cities to return to halogen lighting since the light fixtures can use cheaper halogen bulbs. Consequently, inefficient lighting continue to operate using power hungry halogen lighting.

BRIEF SUMMARY

One aspect of the present invention can include a system, an apparatus, and a method for forward compatible retrofitting roadway light fixtures via a universal adjustable L-bracket. A female lighting socket connector of a light fixture can be removed to expose electrical leads of the fixture. When an electric light is present within the female light socket, the electric light can be removed prior to removing the female lighting socket. A short end of a universal adjustable L-bracket can be affixed to a structural member of the light fixture. A positionable planar LED array can be attached to a long end of the bracket to place the LED in a forward facing position. The position can permit the light emitted from the LED to illuminate an immediate area. Electrical leads of the LED can be directly connected to the exposed electrical leads of the light fixture. The removal and connecting steps can prevent backwards compatibility. When the LED is connected to the fixture, the bracket and the LED can be substantially within an enclosure and/or a hood.

Another aspect of the present invention can include a method, an apparatus, a system for forward compatible retrofitting roadway light fixtures via a universal adjustable L-bracket. An adjustable universal L-bracket can include a short end and a long end. The bracket can include one or more voids for mounting and/or permitting a positionable planar LED array to be directly electrically connected with an electrical lead of a lighting fixture. The LED array can be affixed to the bracket via a U bracket mating with a surface of the L-bracket. The bracket and LED retrofit of the lighting fixture can prevent backwards compatibility with halogen lighting. A positionable planar LED array can be able to illuminate a surrounding area of the lighting fixture when activated.

Yet another aspect of the present invention can include a system, an apparatus, and a method for forward compatible retrofitting roadway light fixtures via a universal adjustable L-bracket. A roadway lighting fixture of a structural support member, an enclosure, and a halogen bulb with a male socket connector connected to a power source via a female socket connector can be retrofitted. The female socket connector can be an E39 socket type. The retrofitting can remove the halogen bulb and female socket connector. An adjustable universal L-bracket can be utilized to place a positionable planar LED array able to emit light to illuminate the area surrounding the light fixture when the LED array is activated. The LED array can be directly electrically connected to the lighting source. The retrofitting can prevent the subsequent use of a halogen bulb in the lighting fixture.

DETAILED DESCRIPTION

The present disclosure is a solution for forward compatible retrofitting roadway light fixtures via a universal adjustable L-bracket. In the solution, a positionable planar LED array can be directly connected to an electrical power source of a roadway lighting fixture via one or more electrical leads. In one embodiment, LED array can be affixed to a universal adjustable L-bracket which can be secured against one or more mounting points within an enclosure of the light fixture. In the embodiment, a female socket connector and be removed exposing fixture electrical leads which can be mated to electrical leads of the LED array. That is, the retrofit using the planar LED array and the L-bracket can prevent backwards compatibility.

As will be appreciated by one skilled in the art, aspects of the present invention may be embodied as a system, method or an apparatus. Retrofitting can be the addition of new technology and/or features to an older system. In one embodiment, retrofitting can be backwards compatible, forwards compatible, and the like. Forwards compatible can permit future technologies to integrated seamlessly with an older system while perverting previous technologies from being utilized with the system.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
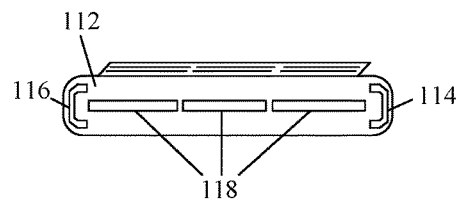
FIGS. 1A (front view), 1B (side view), 1C (top view), 1D (bottom view with light), and 1E (side view with light) are schematic diagrams illustrating a set of embodiments for forward compatible retrofitting roadway light fixtures via a universal adjustable L-bracket in accordance with an embodiment of the inventive arrangements disclosed herein.
Figure 1B:
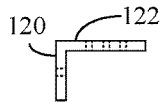
Figure 1C:
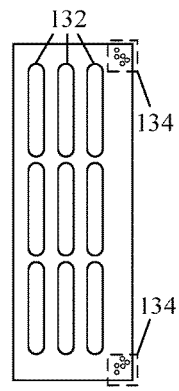
Figure 1D:
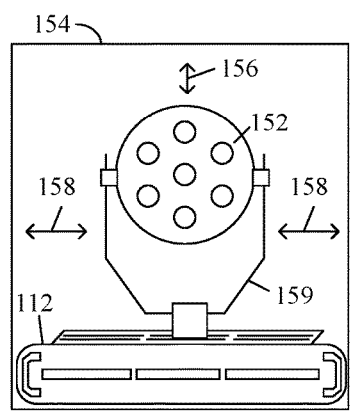
Figure 1E:
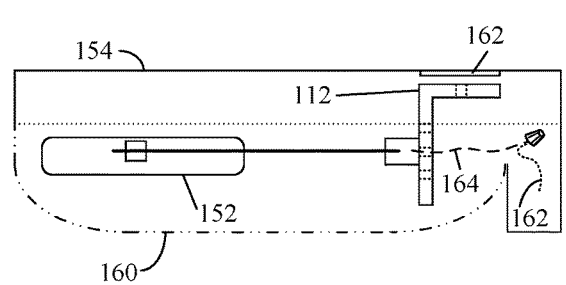

FIGS. 1A (front view), 1B (side view), 1C (top view), 1D (bottom view with light), and 1E (side view with light) are schematic diagrams illustrating a set of embodiments 110, 150 for forward compatible retrofitting roadway light fixtures via a universal adjustable L-bracket in accordance with an embodiment of the inventive arrangements disclosed herein. Embodiment 110, 150 can include, but is not limited to, front view 111, side view 121, 161, top view 131, bottom view 151, and the like. In one instance, embodiment 110 can be present in the context of embodiment 150. Embodiments 110, 150 can be present in the context of system 200, embodiments 310, 350, and/or method 400.

It should be appreciated that L-bracket 112 can permit LED array 152 to be completely mounted within enclosure of fixture 154 enabling hood 160 to be fitted normally. The L-bracket 112 of the disclosure can be utilized within roadway lighting, area lighting, high bay lighting, low bay lighting, sports lighting, flood lighting, garage lighting, canopy lighting, post top lighting, and the like.

As used herein, a light fixture can be placed within a public or private access roadway or space to provide illumination within an immediate environment of the light fixture. Fixture 152 can include, but is not limited to, street lighting, park lighting, stadium lighting, and the like. Fixture 152 can include, high-wattage bulbs, but is not limited to, 50 watt light bulbs, 100 watt light bulbs, 150 watt light bulbs, and the like. In one instance, fixture can include, but is not limited to, a structural member (e.g., post), an interior enclosure, a reflector, a lighting hood, a lighting element (e.g., bulb), and the like. In one embodiment, lighting element can include, but is not limited to, Halogen bulbs, Mercury Vapor bulbs, High-Pressure Sodium (HPS) bulbs, Metal-Halide (MH) bulbs, and the like. In the embodiment, fixture 152 can include a mogul compatible female connector for securing bulb. For example, fixture 152 can include a North America E39 female socket connector.

It should be appreciated that a light fixture can be an electrical device used to create artificial light by use of an electric lamp. Electric lamp can include, but is not limited to, an electric light, a light bulb, and the like.

As used herein, an LED array 152 can be a set of Light Emitting Diode configured to operate in parallel. LED array 152 can include, but is not limited to, a bracket 159, a mounting base, electrical leads, heat sink, fan, and the like. A lead can be an electrical connection including a length of wire and/or metal pad that comes from a device. Leads can be used for physical support, to transfer power, to probe circuits, to transmit information, and the like. In one embodiment, LED array 152 can be secured via mounting base through one or more voids 132, 118. In the instance, LED array 152 can include multiple LED arrays, multiple brackets, and the like.

In embodiment 110, an L-bracket 112 can permit an LED array (e.g., 152) to be fitted into an existing light fixture (e.g., 154). L-bracket 112 can be an architectural element which can be structural or decorative. L-bracket 112 can include mount ends 114, 116, short end 120, long end 122, voids 118, 132, 134, and the like. Voids 118, 131, 134 can include, but is not limited to, one or more openings, one or more holes, and the like.

Front view 111 illustrates mount points 114, 116 located along the short end 120 with rectangular voids 118 within the center portion of short end 120. In one instance, short end 120 can be affixed to a mounting point 162 of light fixture 154. In the instance, mount ends 114, 116 can be utilized to position a positionable planar LED array 152 parallel to a ground surface to ensure lighting of an immediate area is performed.

In side view 121, short end 120 and long end 122 can be perpendicular forming an 'L' shape. In one embodiment, short end 120 can include voids 118. In one instance, mount ends 114, 116 can be voids. In one instance, long end 122 can include voids 132, 134.

In top view 131, an array of voids 132 can permit customized placement of a positionable planar LED array 152 within an enclosure of a light fixture 154. For example, voids 132 can be a set of nine rounded rectangular voids arranged in a three by three grid. In one instance, LED array 152 base to be mounted into the one or more voids 132. It should be appreciated that voids 132 can be rectangular, circular, oblong, and the like. In one instance, additional mounting points 134 can be present to enable a wide variety of LED arrays to be secured to bracket 112.

It should be appreciated that the bracket 112 can be a "one-size-fits-all" mounting solution which can incentivize green retrofitting programs. That is, bracket 112 can simplify infrastructure retrofits where multiple different types of roadway and/or area lighting exists because the bracket 112 can be fitted into any lighting enclosure.

In embodiment 150, a bottom view 151 can illustrate a positionable planar LED array 152 can be forward compatible retrofitted with array 152 using L-bracket 112. For example, fixture 154 can be a HOLOPHANE MONGOOSE light fixture which can be retrofitted with a planar LED array using L-bracket 112. In the view 151, array 152 position can be laterally adjusted 158 within an enclosure of fixture 154 by the sliding the base within a selected void 132 or changing void 132. In one instance, array 152 can be moved vertically within hood 160, by selecting a void 132 of bracket 112. It should be appreciated that LED array 152 can be adjustable permitting movement of array 152 within direction 156 via sliding array 152 along frame 159.

Side view 161 illustrates one embodiment for mounting planar LED 152 within a hood 160 of a light fixture. In one instance, an electrical lead 164 of planar LED 152 can be directly electrically connected to an exposed electrical lead 162. For example, electrical lead 164 of LED array can be connected to exposed electrical lead of light fixture 154 with a twist on wire connector (e.g., ceramic). In the instance, lead 164, 162 can be pass-through void 132 to enable direct connection. That is, void 132 can function as a cable management hole, permitting pass-through, spooling, and the like. It should be appreciated that bracket 112 can permit LED array 152 to be mounted within hood 160 enabling LED array 152 to be easily retrofitted into existing light fixtures.

Drawings presented herein are for illustrative purposes only and should not be construed to limit the invention in any regard. In one embodiment, LED array can be directly connected to one or more electrical contacts including, but not limited to, a screw terminal, a proprietary electrical connector, and the like. In one instance, one or more L-brackets can be utilized to secure LED array within fixture 154.

It should be appreciated that bracket 112 can include equivalent ends. For example, bracket 112 can include two "long ends" or two "short ends". In one embodiment, bracket 112 can include multiple mount points, multiple ends (e.g., U shaped bracket, W shaped bracket), and the like. In one embodiment, a W shaped bracket can include a long end a middle plate with two connected short ends (e.g., gap in the middle).

Figure 2:
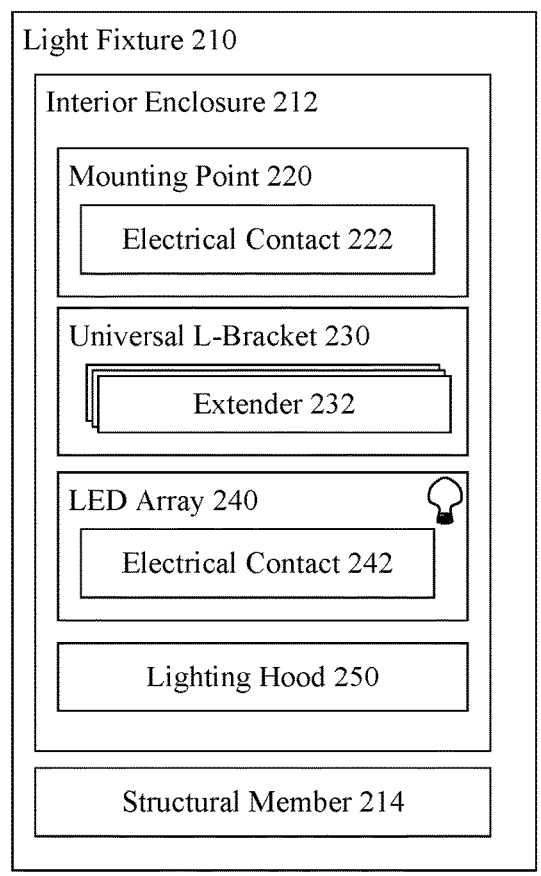
FIG. 2 is a schematic diagram illustrating a system for forward compatible retrofitting roadway light fixtures via a universal adjustable L-bracket in accordance with an embodiment of the inventive arrangements disclosed herein.

FIG. 2 is a schematic diagram illustrating a system 200 for forward compatible retrofitting roadway light fixtures via a universal adjustable L-bracket in accordance with an embodiment of the inventive arrangements disclosed herein. System 200 can be present in the context of embodiment 110, 150, 310, 350, and/or method 400.

Light fixture 210 can be a raised source of light on the edge of a road or walkway. Light fixture 210 can include an interior enclosure 212 and a structural member 214. Enclosure 212 can include, but is not limited to, a mounting point 220, a universal bracket, 230, an LED array 240, a lighting hood 250, and the like. In one instance, fixture 210 can include a female lamp socket which can be removed during retrofitting. Fixture 210 can include devices associated with cantilever, single guy bracket, and the like.

Interior enclosure 212 can include a cavity win which LED array 240, hood 250, and/or electrical components can reside. Enclosure 212 can include transparent portions, opaque portions, and the like. Enclosure 212 can conform to traditional and/or proprietary designs and/or structures.

Mounting point 220 can be a portion able to be secure one or more structures (e.g., universal bracket 230). Mount point 220 can include an electrical contact 222. It should be appreciated that mount point 220 can include multiple mounting points within enclosure 212.

Universal bracket 230 can be an adjustable universal L-bracket for securing lighting element 240. In one instance, bracket 230 can include one or more extenders. In the instance, extenders can be utilized to increase the lateral length of a short end of the bracket 230 to any arbitrary length. In one embodiment, bracket 230 can lack extender 232. In one embodiment, bracket 230 can be utilized to control light dispersion by permitting LED array 240 to be adjusted for optimal dispersion. For example, bracket 230 can be utilized for forward compatible retrofitting General Electric wall mount luminaires or ATLAS flood lights.

In one instance, bracket 230 can permit multiple LED arrays to be connected, multiple brackets of a singular LED array, and the like.

In another instance, bracket 230 can permit the mounting of a baffle, guard, reflector, and the like. For example, bracket 230 can allow a cosmetic shield to be affixed around LED array to substantially seal the enclosure from environmental debris.

LED array 240 can be an adjustable planar lighting element able to connect to contact 222 via contact 242. It should be appreciated that array can include or lack a male socket connector.

Lighting hood 250 can be a covering able to seal interior enclosure 212. It should be appreciated that hood 250 can be openable, closable, removable, and the like.

Structural member 214 can be a rigid supporting structure able to support enclosure 212 and/or components 220, 250. Member 214 can include a post, a cantilever, and the like. Member 214 materials can include, but is not limited to, metal, wood, and the like.

Drawings presented herein are for illustrative purposes only and should not be construed to limit the invention in any regard. It should be appreciated that the system 200 lacks a female and/or male socket connector. It should be appreciated that array 240 can include light-sensitive capabilities permitting automatic activation/deactivation when light is or is not needed (e.g., dusk, dawn, dark weather). For example, LED array 240 can be connected to light sensitive photocells which can detect ambient light levels. In instances where legacy equipment is utilized, array 240 can be connected to timing mechanisms (e.g., solar dials).

It should be appreciated that the bracket of the disclosure can be utilized to retrofit multiple styles of roadway light fixtures including, but not limited to, transitional styles (e.g., bishop crook), contemporary styles (e.g., mast arm), classic styles, architectural styles, and the like.

Figure 3A:
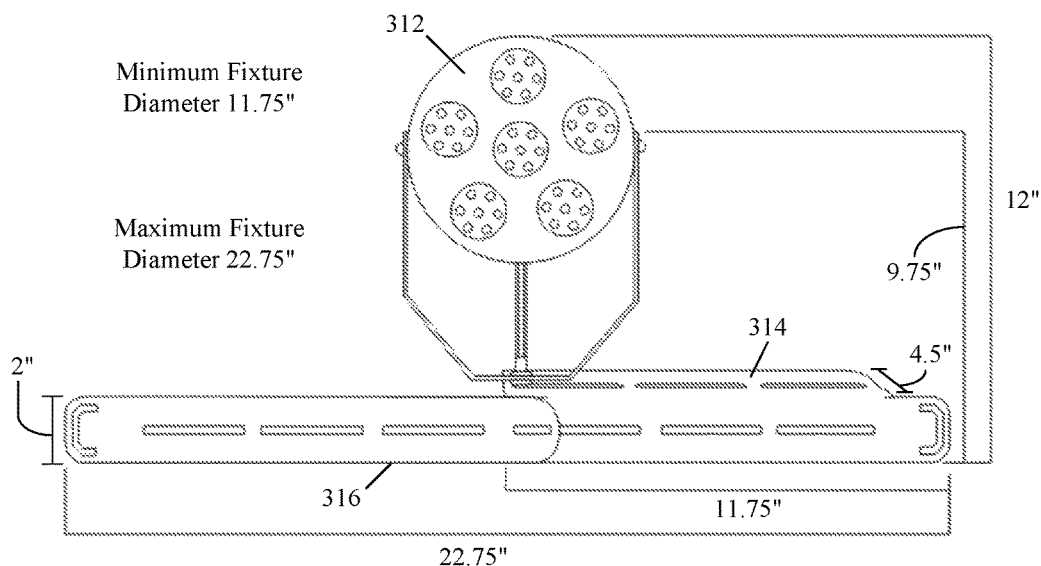
FIGS. 3A and 3B are schematic diagrams illustrating a set of embodiments for forward compatible retrofitting roadway light fixtures via a universal adjustable L-bracket in accordance with an embodiment of the inventive arrangements disclosed herein.
Figure 3B:
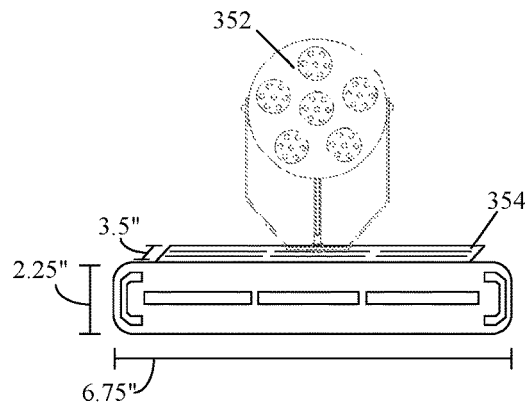

FIGS. 3A and 3B are schematic diagrams illustrating a set of embodiments 310, 350 for forward compatible retrofitting roadway light fixtures via a universal adjustable L-bracket in accordance with an embodiment of the inventive arrangements disclosed herein. Embodiments 310, 350 can be present in the context of embodiments 110, 150, system 300 and/or method 400. Embodiments 310, 350 illustrate two different embodiments of a universal adjustable L-bracket.

In embodiment 310, an L-bracket 314 can include an extension plate 316 which can permit planar LED array 312 to be mounted within an enclosure as large as twenty-two point seven five inches and as small as eleven point seven five inches. In one embodiment, plate 316 can be affixed to bracket 314 via one or more voids within plate and bracket. In the embodiment, plate 316 can include a mount end similar to bracket 314. That is, extension plate 316 can permit planar LED array 312 to be mounted an any offset from eleven point seven five inches to twenty-two point seven five inches. In one instance, bracket dimensions can include a short end with a height of two inches and a length of eleven point seven five inches and a long end with a length of ten point two five inches and a width of four point five inches. In one embodiment, plate 316 can have a height of two inches and can be affixed to short end of bracket 314. It should be appreciated that planar LED array 312 can extend nine point seven five inches at the center and up to twelve inches at the edge when mounted to long end of bracket 314.

In embodiment 350, a compact variant 354 of the L-bracket of the disclosure can be utilized to mount planar LED array 342 within enclosures smaller than eleven point seven five. In the embodiment, variant 354 can have a short end with a length of six point seven five inches and a height of two point two five inches. In the embodiment, variant 354 can have a long end with a width of three point five inches and a length five point seven five inches.

Drawings presented herein are for illustrative purposes only and should not be construed to limit the invention in any regard. It should be appreciated that embodiments 310, 350 are not limited to the dimensions described herein and can include any arbitrary length which permits fitting within an enclosure.

Figure 4:
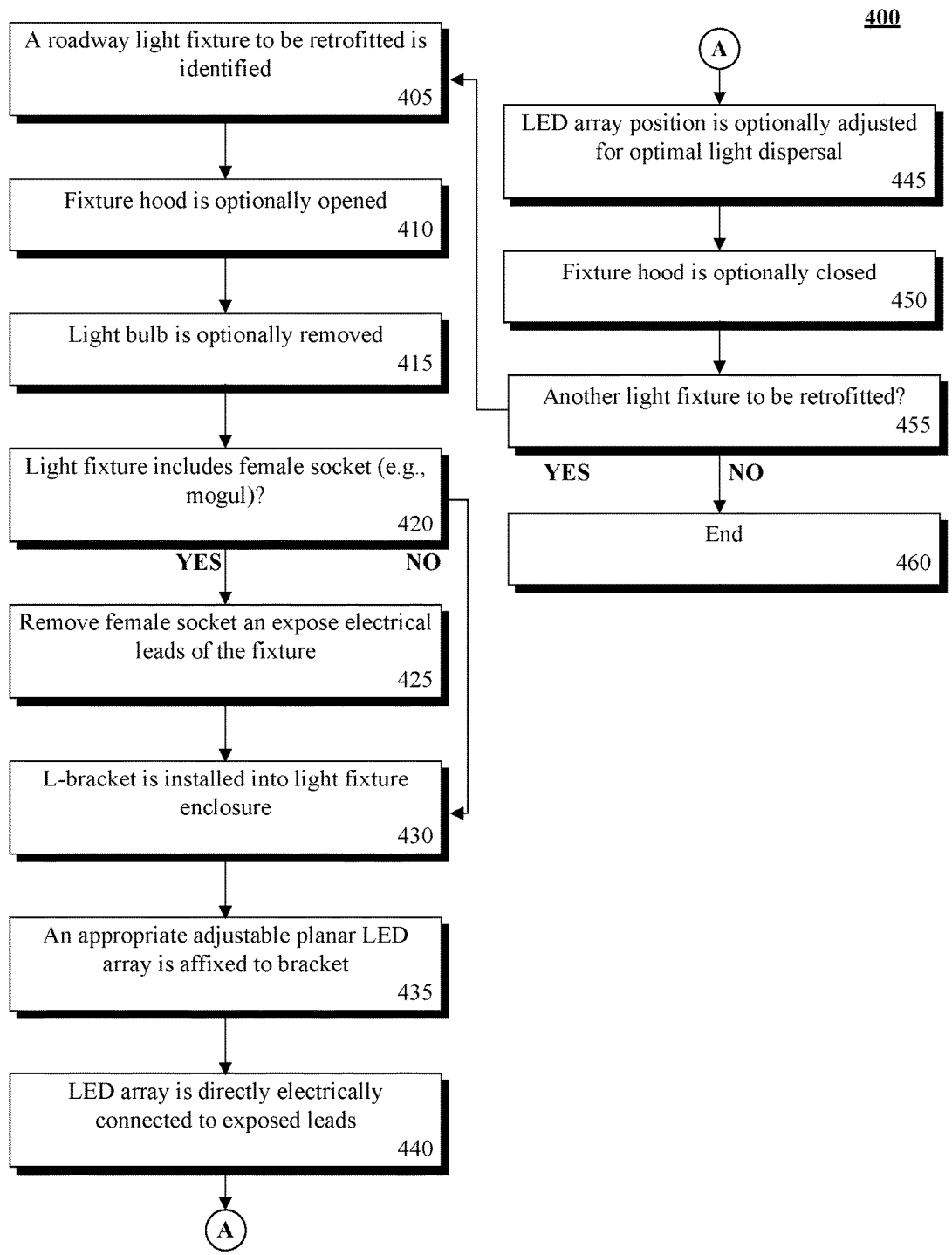
FIG. 4 is a schematic diagram illustrating a method for forward compatible retrofitting roadway light fixtures via a universal adjustable L-bracket in accordance with an embodiment of the inventive arrangements disclosed herein.

FIG. 4 is a schematic diagram illustrating a method 400 for forward compatible retrofitting roadway light fixtures via a universal adjustable L-bracket in accordance with an embodiment of the inventive arrangements disclosed herein. Method 400 can be present in the context of embodiment 110, 150, system 200, and/or embodiment 310, 350. In method 400, a roadway light fixture can be retrofitted with a positionable planar LED array. The array can be secured to a L-bracket which can permit LED array to be mounted within an enclosure of the light fixture.

In step 405, a roadway light fixture to be retrofitted can be identified. In step 410, the fixture hood can be optionally opened. In step 415, if a light bulb is present, the light bulb can be optionally removed. In step 420, if the light fixture includes a female socket (e.g., mogul), the method can continue to step 425, else proceed to step 430. In step 425, the female socket can be removed and an electrical lead of the fixture can be exposed. In step 430, an L-bracket can be installed into the light fixture. In step 435, an appropriate positionable planar LED array can be affixed to the bracket.

In step 440, the LED can be directly electrically connected to exposed leads. In step 445, the LED array position can be optionally adjusted for optimal light dispersal. In step 450, the fixture hood can be optionally closed. In step 455, if another light fixture to be retrofitted, the method can return to step 405, else continue to step 460. In step 460, the method can end.

Drawings presented herein are for illustrative purposes only and should not be construed to limit the invention in any regard. Steps 405-460 can be performed in serial and/or in parallel. It should be appreciated that method 400 can performed in real-time or near real-time.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for retrofitting a halogen light fixture comprising:
    an adjustable universal L-bracket comprising of a short end and a long end, wherein the L-bracket comprises of a plurality of voids for mounting or permitting a positionable planar LED array to be directly electrically connected with an electrical lead of a lighting fixture, wherein the LED array is affixed to the bracket via a U bracket mating with a surface of the L-bracket, wherein the bracket and LED retrofit the lighting fixture to prevent backwards compatibility with halogen lighting; and
    the positionable planar LED array able to illuminate a surrounding area of the lighting fixture when activated.
2. The system of claim 1, further comprising:
    an extension plate able to be affixed to the L-bracket to enable the L-bracket to be mounted within light fixture enclosures of dimensions greater than 11.75 inches.
3. The system of claim 1, wherein the L-bracket is able to be adjusted at least one of horizontally and vertically within the enclosure of the lighting fixture.
4. The system of claim 1, wherein the L-bracket is able to be mounted within the enclosure of the light fixture to permit the LED array to be mounted at least one of parallel to a ground plane, perpendicular to a ground plane, and at an arbitrary angle to a ground plane.
5. The system of claim 1, wherein the plurality of voids permits passing the electrical lead of the lighting fixture or the electrical leads of the LED array.
6. The system of claim 1, wherein the L-bracket width, height, and length dimensions are within twenty percent of 11"×2"×4.5".
7. The system of claim 1, wherein the L-bracket width, height, and length dimensions are within twenty percent of 6"×2.5"×3.5".
8. The system of claim 1, wherein the light fixture is a roadway lighting fixture.
9. The system of claim 1, wherein the light fixture is a security lighting fixture.
10. A method for retrofitting a halogen light fixture comprising:
    removing from a light fixture a female lighting socket connector to expose electrical leads of the light fixture, wherein when an electric light is present within the female light socket, removing the electric light prior to removing the female lighting socket;
    affixing a short end of a universal adjustable L-bracket to a structural member of the light fixture;
    attaching a positionable planar LED array to a long end of the bracket to place the LED array in a forward facing position, wherein the forward facing position permits the light emitted from the LED to illuminate the immediate area surrounding the light fixture;
    directly connecting electrical leads of the LED array to the exposed electrical leads of the light fixture, wherein the removal and connecting steps prevents backwards compatibility with a light bulb, wherein when the LED array is directly electrically connected to the lighting fixture, the bracket and the LED array is substantially within at least one of an enclosure and a hood permitting the at least one of the enclosure to close.
11. The method of claim 10, wherein the L-bracket is able to be adjusted at least one of horizontally and vertically within the enclosure of the lighting fixture.
12. The method of claim 10, further comprising:
    affixing an extension plate to the L-bracket to enable the L-bracket to be mounted within light fixture enclosures with a dimension of greater than 11.75 inches.
13. The method of claim 10, further comprising:
    mounting the L-bracket within the enclosure of the light fixture to permit the LED array to be mounted at least one of parallel to a ground plane, perpendicular to a ground plane, and at an arbitrary angle to a ground plane.
14. The method of claim 10, further comprising:
    passing exposed electrical leads or the electrical leads of the LED array through at least one of a plurality of voids within the L-bracket or an extension plate.
15. The method of claim 10, wherein the L-bracket width, height, and length dimensions are within twenty percent of 11"×2"×4.5".
16. The method of claim 10, wherein the L-bracket width, height, and length dimensions are within twenty percent of 6"×2.5"×3.5".
17. The method of claim 10, wherein the light fixture is a roadway lighting fixture.
18. The method of claim 10, wherein the female socket is an E39 mogul socket.
19. The method of claim 10, further comprising:
    removing at least one of a halogen light bulb, high pressure sodium bulb, metal halide bulb, mercury vapor bulb, and a bulb connector from the light fixture.
20. A method for retrofitting a halogen light fixture comprising:
    retrofitting a roadway lighting fixture comprising of a structural support member, an enclosure, and a halogen bulb with a male socket connector connected to a power source via a female socket connector, wherein the female socket connector is an E39 socket type, wherein the retrofitting removes the halogen bulb and female socket connector, wherein an adjustable universal L-bracket is utilized to place a positionable planar LED array able to emit light to illuminate the area surrounding the light fixture when the LED array is activated, wherein the LED array is directly electrically connected to the lighting source, wherein the retrofitting prevents the subsequent use of a halogen bulb in the lighting fixture.

* * * * *